July 1, 1958 A. SCHMIDT 2,841,177
APPARATUS FOR AUTOMATIC MEASUREMENTS OF LIQUIDS
Filed June 28, 1951 2 Sheets-Sheet 1

INVENTOR
ARNOLD SCHMIDT
BY
Richards Geier
ATTORNEYS

July 1, 1958  A. SCHMIDT  2,841,177
APPARATUS FOR AUTOMATIC MEASUREMENTS OF LIQUIDS
Filed June 28, 1951  2 Sheets-Sheet 2
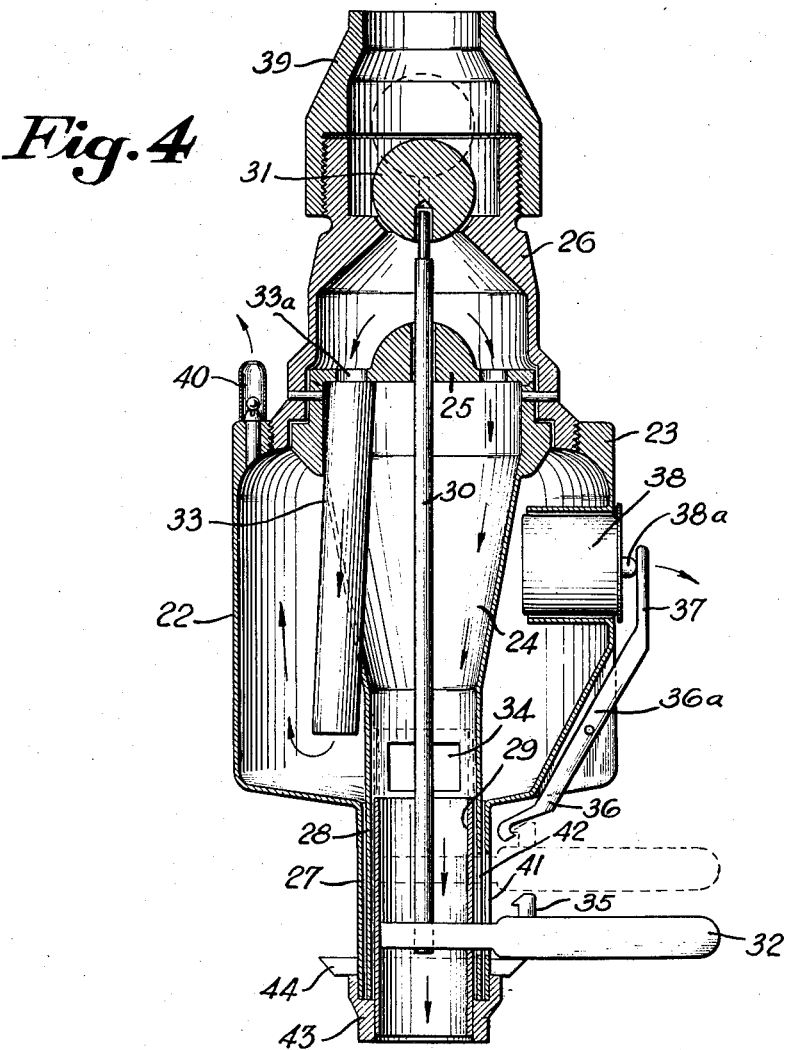
Fig.4
Fig.5
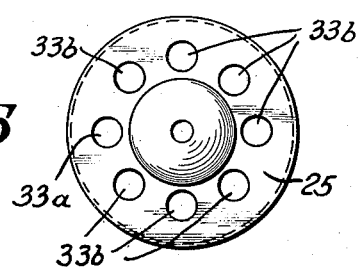
INVENTOR
ARNOLD SCHMIDT
BY
ATTORNEYS United States Patent Office 2,841,177
Patented July 1, 1958

2,841,177

APPARATUS FOR AUTOMATIC MEASUREMENTS OF LIQUIDS

Arnold Schmidt, Hamburg-Bergedorf, Germany, assignor to Askania Werke Aktiengesellschaft, Berlin-Friedenau, Germany, a corporation of Germany Application June 28, 1951, Serial No. 234,014

Claims priority, application Germany July 7, 1950

13 Claims. (Cl. 137—614.14)

This invention relates to a method and an apparatus for precisely and automatically measuring predetermined amounts of liquid.

An object of the present invention is to provide an apparatus for measuring liquids which would be devoid of drawbacks inherent to prior art devices.

Another object of the present invention is the provision of a method and of an apparatus for measuring liquids which will be so constructed that dangers of erroneous measurements will be effectively avoided.

So-called measuring clocks known in prior art have the drawback that they require a considerable amount of attention on the part of the operator in order to close off these devices within the limits of calibration at the time the desired amount of liquid has been measured.

Other automatic devices known in prior art employ floats which are inconvenient in use since the measurements become erroneous as soon as such floats are damaged or bent in any way or spring a leak. These devices have the further drawback that they are stationary and require a considerable amount of space.

Yet another object of the present invention is to eliminate all these drawbacks and to provide a device which will operate entirely independently of static pressure relationship and which will determine the exact amount, irrespective of the speed of the flow.

Still another object of this invention is the provision of an apparatus of small weight and which will occupy little space so that it can be conveniently transported from place to place and can be easily set up or attached to a larger unit.

A still further object of the invention is the provision of a measuring apparatus which can be used equally well for stationary liquid containers as well as for movable tank cars or the like.

Other objects of the present invention will become apparent in the course of the following specification.

In attaining the objects of the present invention it will be found desirable to provide a method and an apparatus for precisely, automatically measuring predetermined amounts of liquid, which consists in that the current of the liquid at the time of its flow is separated into a main current and a measuring current whereupon the measuring current is measured by the so-called time-steering to determine the amount of liquid, and as soon as a predetermined amount of liquid is reached the measuring current is used to operate a device for the purpose of automatically closing the main flow.

The apparatus for carrying out the process in accordance with the present invention may include a measuring chamber which receives the measuring current and which is provided with a device operable when the amount of measuring current reaches a predetermined pressure so as to cut off the main flow of the liquid. It is immaterial whether the measuring current thereafter is returned to the main current or whether it is used for some other purposes.

Let it be assumed, by way of example, that measuring chamber contains two liters. Then the ratio may be so set that if the desired amount of the liquid to be measured consists of 20 liters, as soon as the measuring period is reached, namely when the measuring chamber is full, the main current may consist of 18 liters, and then the measuring current may be returned to the main current so as to add to the full amount of 20 liters. On the other hand, the device may be so constructed that at the time the measuring period is reached, the main flow will amount to the full 20 liters.

In accordance with the present invention the setting of the amount which is to be measured takes place by increasing or diminishing the amount of the measuring liquid diverted to the measuring chamber by comparison to the remaining amount of the liquid. It is thus apparent that static pressure conditions and the speed relationship of the liquid current have no effect whatsoever upon the measurements so that when the speed of flow of the liquid is faster, the measuring chamber will be filled quickly and, on the other hand, when the liquid flows slowly, a longer period of time will be required to fill the measuring chamber until the time period when the chamber is full and the flow of the main current is interrupted. Thus, for the purposes of the present invention the determining factor is the amount of time required to fill the measuring chamber with a liquid. The measuring chamber acts essentially as a clock which is actuated automatically after a time period required for the flow of a predetermined amount of liquid, corresponding to the prevailing static pressure conditions and the prevailing speed of flow.

The invention will appear more clearly from the following detailed description when taken in connection with accompanying drawings showing by way of example preferred embodiments of the inventive idea.

In the drawings:

Figure 4 is a longitudinal section through a somewhat differently constructed apparatus.

Figure 5 is a top view of the cover shown in section in Figure 4.

Figure 1:
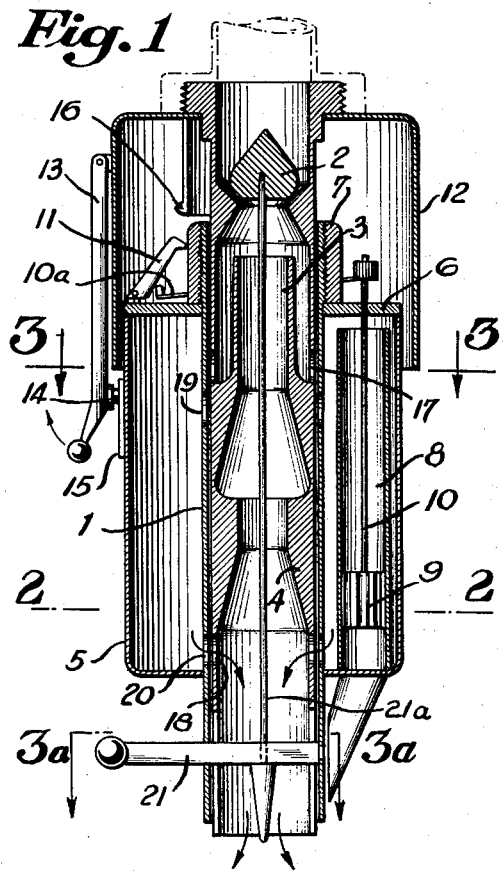
Figure 1 shows, in longitudinal section, an apparatus constructed in accordance with the principles of the present invention.
Figure 2:
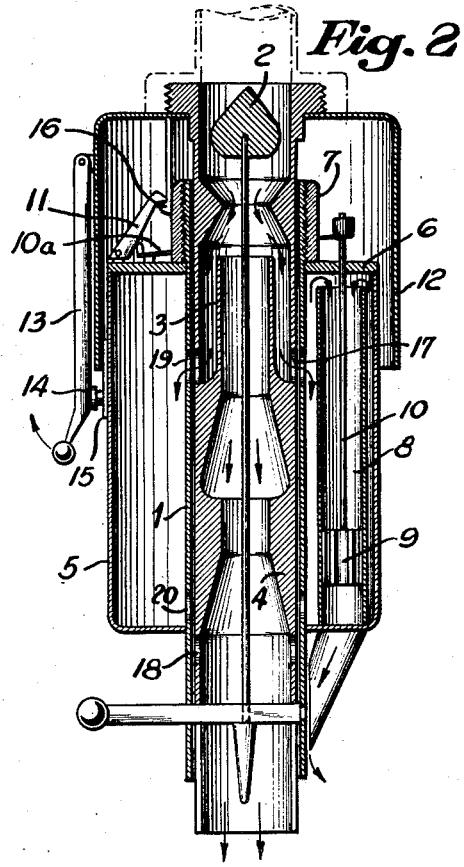
Figure 2 is similar to Figure 1 and shows the apparatus in a different position.
Figure 3:
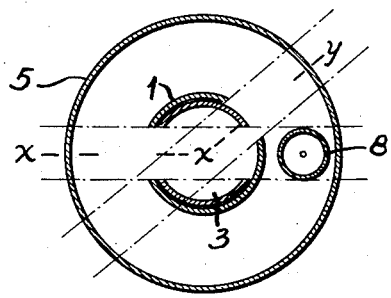
Figure 3 is a transverse section along the line 3—3 of Figure 1.
Figure 3A:
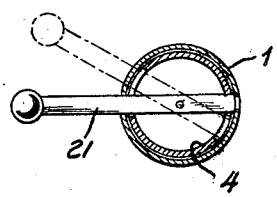
Figure 3a is a section along the line 3a—3a of Fig. 1.

The apparatus shown in Figures 1, 2, and 3 of the drawings include a guide pipe 1 and a valve 2 which is operable to close or open the flow of liquid through the device. The pipe 1 surrounds a dividing nozzle 3 which is used to divide the flow of liquid through the pipe line into a main current and a measuring current. The nozzle 3 is connected with a Venturi tube or flow tunnel 4.

A measuring container 5 is located concentrically in relation to the pipe 1 and is connected therewith. The container 5 is covered by a cover 6, connected with a flange 7, provided with inner screw threads and adapted to be screwed upon pipe 1. The container 5 is axially movable in relation to the tunnel 4 and can be turned relatively thereto.

A pipe 8 is located within the container 5 and contains a stable, easily movable piston 9 which is connected with a piston rod 10 extending through the pipe 8 and through the cover 6. A lever 10 pivotally connects the piston rod 10 with a blade lock 11.

The upper portion of the container 5 is covered by a cap 12 which carries a lock lever 13. The lever 13 is provided with a projection 14 which may be introduced into one of a number of grooves provided upon a plate 15, The plate 15 is attached to the outer surface of the container 5.

The cap 12 carries a projection 16 which may be brought into engagement with the lock 11.

The tunnel 4 is provided with a plurality of openings 17 which are located about the nozzle 3 while the lower portion of the tunnel 4 is provided with openings 18. The pipe 1 has corresponding openings 19, which may be located opposite the openings 17, and openings 20 which may be located opposite the openings 18 of the pipe 1. The arrangement of the various openings is such that in the two end positions of the pipe 1 either the upper openings or the lower openings of the pipe 1 are cleared.

The operation of the device is as follows:

Figure 1 shows the apparatus in its position of rest wherein the valve 2 is closed so that the liquid cannot flow through the pipe 1.

In order to set the device for operation, the pipe 1 is raised by means of a handle 21 from the position 1—1 to the position 2—2 of Figure 1. In the upper position 2—2 the blade lock 11 engages the projection 16 so that the pipe 1 will be held in this upper position.

As a result of this upward movement of the pipe 1 the openings 20 are moved upwardly so that the openings 18 are closed. At the same time the openings 19 of the pipe 1 will be brought into alignment with the openings 17 so that a flow of the liquid will be provided. The valve 2 is connected with a handle 21 by means of the rod 21a so that the valve 2 will be raised along with the handle 21. Then liquid will flow into the apparatus. The liquid will be separated within the apparatus into a main current, which will continue to flow in the tunnel 4, and a measuring current which will pass through the openings 17 and 19 into the interior of the container 5. The container 5 will be gradually filled with liquid.

As soon as the interior of the container 5 is filled with liquid, the liquid will reach the upper edges of the pipe 8 and will overflow into the pipe 8, striking the piston 9. Air located in the container 5 can escape downwardly through the grooves of the piston 9 as the interior of the pipe 8 is being filled. The narrowing lower end of the pipe 8 serves the purpose of removing air from the container 5 and emptying the liquid in the pipe 8. It should be noted that the pipe 8 is filled during a small fraction of a second so that despite the grooves of the piston 9 the entire pressure can act upon the piston. As a result of pressures exerted from above by the column of liquid upon the piston 9, the piston 9 will be moved downwardly. The piston rod 10 will move downwardly along with the piston 9 and will swing the leverage system 10a, the result that the lock 11 will be operated and will be released from the projection or catch 16. Then the pipe 1, by gravity, will move downwardly from the upper position 2—2 to the lower position 1—1. Then the openings 17 will be closed and the valve 2 will be closed also. On the other hand, the openings 20 will be open so that the liquid within the interior of the container 5 will be able to flow through the openings 20, and out of the apparatus.

The amount of liquid flowing through the pipe 1, and the amount of liquid flowing through the container 5, are always in the same ratio, irrespective of the procedure of filling the apparatus, and irrespective of the variable levels of liquid in the main tank, since the resistances and the measurements of the nozzles and openings in the pipe 1 and the measuring container 5 are precisely adjusted, one in relation to the other, so that there is always the same amount of liquid which flows from the apparatus.

The amount of the outflowing liquid can be regulated by turning the pipe 1 in relation to the tunnel 4, since such turning will result in a decrease in the size of the openings 17 which, in turn, will throttle the amount of liquid flowing into the container 5, as is shown in Figure 3 on the right side of that figure. The position indicated as X—X corresponds to a large inflow and a small outflow from the apparatus, while the position indicated as X—Y corresponds to a smaller inflow and a larger outflow.

The desired position of the container 5 in relation to the tunnel 4 may be set by means of the projection 14 which is carried by the lever 13 and which projects into one of the grooves provided upon the plate 15. The projection 14 will hold the container 5 in a rotated position, without affecting in any way the vertical up and down movement of the container 5 along with the pipe 1.

Figures 4 and 5 show a somewhat different apparatus by means of which predetermined amounts of liquid may be dispensed. By way of example, the apparatus may be set to dispense 20 liters, and the relationship of the main flow of liquid to the measuring current may be 1:7 so that the space of the measuring chamber may constitute 2½ liters.

The apparatus shown in Figures 4 and 5 includes a measuring container 22 which is open at the top and which carries at the top a threaded ring 23. The container 22 includes an outflow tunnel 24 which is located within the container. The tunnel 24 carries a perforated plate 25. The tunnel 24 is firmly held within the container 22 by a dome-shaped member 26 which is screwed into the ring 23 and which also engages the plate 25. The member 26 also constitutes a valve seat for a valve body 31. The lower end of the container 22 carries a pipe 27 and the end 28 of the funnel 24 projects into the pipe 27. A tubular slide 29 is located in the cylindrical end 28 of the funnel 24. The slide 29 carries a valve rod 30 which is centrally located and which extends through the funnel 24 and the plate 25 and the upper end of which carries the valve body 31. A handle 32 is firmly connected with the slide 29 so that the slide may be moved up and down by means of the handle.

A tube 33 extends from the funnel 24 into the container 22 and is in engagement with an opening 33a of the plate 25. The general disposition of the openings in the plate 25 is such that seven eighths of the liquid flows directly into the tunnel 24 while one eighth of the liquid flows through the opening 33a and the tube 33 into the container 22. The tubular end 28 of the tunnel 24 has openings 34 which are located within the container 22 and which are closed to prevent an outflow of the liquid from the container 22 when the valve slide 29 covers the openings.

The handle 32 carries a hook 35 which may be brought into engagement with an arm 36 of a two-armed lever 36a. The second arm 37 of the lever 36a is in engagement with a projection 38a of a piston 38, which is located in the container 22.

The upper end of the container is connected with a pipe section 39. The pipe section 39 may be attached to the main container or tank which is not shown in the drawings.

A valve 40 serves the purpose of evacuating air contained in the container 22. The valve 40 is of such shape that the air cannot raise the small ball constituting a part of the valve. As soon as the container is filled and the liquid flows into the valve 40 the ball is raised upwardly by the flow of the liquid to close the valve, thus preventing the escape of the liquid and facilitating the development of pressure in the container 22.

The handle 32 is movable within a slot 41 of the pipe 27, and within a slot 42 of the lower end 28 of the tunnel 24. The downward movement of the handle 32 is limited by an annular stop 43. The stop 43 is preferably connected with a container 44 which is used to receive drops which might be accumulated upon the upper surfaces of the apparatus.

The operation of this device is as follows:

The operator shifts the slide 29 upwardly by means of the handle 32, and in this upper position the slide 29 is held by the engagement of the hook 35 with a hook-shaped end of the lever 36a. This upward movement of the slide 29 closes the openings 34 and at the same time raises the valve body 31 from the dome-shaped member 26 so that the liquid can flow into the apparatus from the pipe section 39. The liquid flows through all of the openings of the plate 25. As shown in Figure 5, there are seven openings 33b through which the liquid will flow directly into the interior of the tunnel 24, while through one opening, namely the opening 33a, the liquid will flow into the tube 33 and then into the interior of the container 22. In the example illustrated, the container 22 will be filled by 2½ liters of liquid whereupon, at the time when the container 22 is completely filled, a pressure will be developed in the container for a short time which will suffice to push outwardly the piston 38, thereby swinging the lever 36a and releasing the hook 35. Then the slide 29 drops by gravity to the position shown in full lines in Figure 4, closing the valve body 31. The flow of liquid into the apparatus will then be cut off. At the same time the openings 34 will be cleared by the slide 29 so that the container 22 will be emptied of the liquid which will flow out of the openings 34 and through the slide 29 and out of the apparatus. Since in the example illustrated 17½ liters passed through the tunnel 24 during the measuring operation, the amount of liquid within the container 22, which is equal to 2½ liters, will be added to the main flow so that the total amount of liquid will be 20 liters.

It is apparent that the examples set forth above have been given solely by way of illustration and not by way of limitation, and they are subject to many variations and modifications within the scope of the present invention. All such variations and modifications are to be included within the scope of the present invention.

What is claimed:

1. An apparatus for precisely and automatically measuring predetermined amounts of liquid, said apparatus comprising, in combination, a flow tunnel, a measuring container located coaxially to the flow tunnel and axially and circumferentially movable relatively thereto, said tunnel and container having two sets of openings located at different levels, said measuring container being movable axially relatively to said flow tunnel to two end positions, one set of said openings being substantially in alignment in one of said end positions and the other set of said openings being substantially in alignment in the other one of said end positions, means connected with said flow tunnel and directing a part of the current flowing therethrough through one of said sets of openings to said measuring container, a valve closing and opening the flow of liquid through said tunnel, means operatively connecting said valve with said measuring container, means locking said valve and said measuring container in one of said end positions, a liquid-responsive device within said measuring container, and means connecting said liquid-responsive device with said locking means and operable to release said locking means.

2. An apparatus for precisely and automatically measuring predetermined amounts of liquid, said apparatus comprising, in combination, a flow tunnel, a measuring container located coaxially to the flow tunnel and axially and circumferentially movable relatively thereto, said tunnel and container having two sets of openings located at different levels, said measuring container being movable axially relatively to said flow tunnel to two end positions, one set of said openings being substantially in alignment in one of said end positions and the other set of said openings being substantially in alignment in the other one of said end positions, means connected with said flow tunnel and directing a part of the current flowing therethrough through one of said sets of openings to said measuring container, a valve closing and opening the flow of liquid through said tunnel, a handle, means connecting said handle with said measuring container and said valve, whereby a movement of said handle causes simultaneously the axial movement of said measuring container and an actuation of said valve, means locking said valve and said measuring container in one of said end positions, a liquid-responsive device within said measuring container, and means connecting said liquid-responsive device with said locking means and operable to release said locking means.

3. An apparatus for precisely and automatically measuring predetermined amounts of liquid, said apparatus comprising, in combination, a flow tunnel, a measuring container located coaxially to the flow tunnel and axially and circumferentially movable relatively thereto, said tunnel and container having two sets of openings located at different levels, said measuring container being movable axially relatively to said flow tunnel to two end positions, one set of said openings being substantially in alignment in one of said end positions and the other set of said openings being substantially in alignment in the other one of said end positions, means connected with said flow tunnel and directing a part of the current flowing therethrough through one of said sets of openings to said measuring container, a valve closing and opening the flow of liquid through said tunnel, a pipe located in said measuring container and having a top end communicating with said measuring tube to receive the overflow thereof, a piston freely movable within said pipe, a locking device locking said measuring container in a position wherein said one set of openings is in alignment, and means connected with said piston and said locking device and actuated by said piston to unlock said locking device at the end of a measuring procedure.

4. An apparatus for precisely and automatically measuring predetermined amounts of liquid, said apparatus comprising, in combination, a flow tunnel, a measuring container located coaxially to the flow tunnel and axially and circumferentially movable relatively thereto, said tunnel and container having two sets of openings located at different levels, said measuring container being movable axially relatively to said flow tunnel to two end positions, one set of said openings being substantially in alignment in one of said end positions and the other set of said openings being substantially in alignment in the other one of said end positions, means connected with said flow tunnel and directing a part of the current flowing therethrough through one of said sets of openings to said measuring container, a valve closing and opening the flow of liquid through said tunnel, a cap carried by said flow tunnel and at least partly covering said measuring container, locking means carried by said cap and said measuring container for holding said measuring container in one of a plurality of circumferentially different positions, means operatively connecting said valve and said measuring container, other locking means for locking said valve and said measuring container in one of said end positions, a liquid-responsive device within said measuring container, and means connecting said liquid-responsive device with said other locking means and operable to release said other locking means.

5. An apparatus for precisely and automatically measuring predetermined amounts of liquid, said apparatus comprising, in combination, a flow funnel which is open at both ends, a measuring container enclosing said flow funnel, means connected with said flow funnel and directing a part of the liquid flowing therethrough to said measuring container, a tube section slidably mounted in said flow funnel, a valve for closing and opening one end of said flow funnel, means operatively interconnecting said tube section and said valve, a locking device for locking said tube section in an operative position, and a pressure responsive releasing device located in said container for releasing said locking device when the weight of liquid in said measuring container reaches a predetermined amount, said tube section having means providing communication between said container and the other end of said flow funnel in the released position of the tube section and interrupting said communication in the operative position of the tube section.

6. An apparatus for precisely and automatically measuring predetermined amounts of liquid, said apparatus comprising, in combination, a flow funnel, a measuring container enclosing said flow funnel, means connected with said flow funnel and directing a part of the liquid flowing therethrough to said measuring container, said flow funnel including a portion having openings formed therein and communicating with said container, a tube section mounted in said flow funnel and slidable from a position wherein it closes said openings to a position wherein it clears said openings, a valve for closing and opening said flow funnel, means operatively interconnecting said tube section and said valve, and maintaining said valve open when tube section is in the first-mentioned position, a locking device for locking said tube section in the first-mentioned position, and a releasing device located in said container and responsive to the pressure of liquid therein for releasing said locking device.

7. An apparatus for precisely and automatically measuring predetermined amounts of liquid, said apparatus comprising, in combination, a flow funnel, a measuring container enclosing said flow funnel, a cover closing said flow funnel and having a plurality of openings formed therein, a pipe extending from said flow funnel to said measuring container and communicating with at least one of said openings of the cover, at least one other opening of said cover being in communication directly with the interior of said flow funnel, a tube section slidably mounted in said flow funnel, a valve for opening and closing the flow to all the openings of said cover, means operatively interconnecting said tube section and said valve, a locking device for locking said tube section in an operative position, and a releasing device located in said container and responsive to the pressure of liquid therein for releasing said locking device.

8. An apparatus for precisely and automatically measuring predetermined amounts of liquid, said apparatus comprising, in combination, a flow funnel, a measuring container enclosing said flow funnel, means connected with said flow funnel and directing a part of the liquid flowing therethrough to said measuring container, a tube section slidably mounted in said flow funnel, a valve for closing and opening said flow funnel, means operatively interconnecting said tube section and said valve, a handle connected with said tube section, a lock member carried by said handle, a lock lever adapted to engage said lock member for locking said tube section in an operative position, and a piston located in said container and operable by the pressure of liquid in said container to actuate said lock lever and release said tube section, said tube section having means providing communication between said container and said flow funnel in the released position of the tube section and interrupting said communication in the operative position of the tube section.

9. An apparatus for precisely and automatically measuring predetermined amounts of liquid, said apparatus comprising, in combination, a flow funnel, a measuring container enclosing said flow funnel, a cover closing said flow funnel and having a plurality of openings formed therein, means extending from said flow funnel to said measuring container and communicating with at least one of said openings of the cover to direct a part of the liquid flowing through the flow funnel to said measuring container, a tube section slidably mounted in said flow funnel, a valve for closing and opening said flow funnel, a rod connected with said tube section and said valve and extending centrally through said flow funnel and said cover, a locking device for locking said tube section in an operative position, and a releasing device located in said container and responsive to the pressure of the liquid therein for releasing said locking device, said tube section having means providing communication between said container and said flow funnel in the released position of the tube section and interrupting said communication in the operative position of the tube section.

10. An apparatus for precisely and automatically measuring predetermined amounts of liquid, said apparatus comprising, in combination, a flow funnel, a measuring container enclosing said flow funnel, a cover closing said flow funnel and having a plurality of openings formed therein, means extending from said flow funnel to said measuring container and communicating with at least one of said openings of the cover to direct a part of the liquid flowing through the flow funnel to said measuring container, a tube section slidably mounted in said flow funnel, a valve seat constituting a dome extending over said cover and holding said cover and said flow funnel, a threaded ring carried by said container, said valve seat being threaded upon said ring, a valve body for closing and opening said valve seat, means operatively interconnecting said tube section and said valve seat, a locking device for locking said tube section in an operative position, and a releasing device located in said container and responsive to the pressure of liquid therein for releasing said locking device, said tube section having means providing communication between said container and said flow funnel in the released position of the tube section and interrupting said communication in the operative position of the tube section.

11. An apparatus for precisely and automatically measuring predetermined amounts of liquid, said apparatus comprising, in combination, a flow funnel, a measuring container enclosing said flow funnel, means connected with said flow funnel and directing a part of the liquid flowing therethrough to said measuring container, a tube section slidably mounted in said flow funnel, a valve for closing and opening said flow funnel, means operatively interconnecting said tube section and said valve, a handle connected with said tube section, a lock member carried by said handle, a lock lever adapted to engage said lock member for locking said tube section in an operative position, a releasing device located in said container and responsive to the pressure of liquid therein for releasing said lock member from said lock lever, said tube section having means providing communication between said container and said flow funnel in the released position of the tube section and interrupting said communication in the operative position of the tube section, a stop adapted to engage said handle to limit the downward movement thereof, and a drop-catching container connected with said stop.

12. An apparatus for precisely and automatically measuring predetermined amounts of liquid, said apparatus comprising a flow tunnel which is open at both ends, a measuring container of constant volume enclosing said flow tunnel and coaxial therewith, means connected with said flow tunnel and directing a part of the liquid flowing therethrough to said measuring container, a movable valve for closing and opening one end of said flow tunnel, said measuring container having an outflow opening formed therein, means for closing and opening said outflow opening, means operatively connecting said closing and opening means with said valve for moving said closing and opening means jointly with said valve from an inoperative position in which said valve is closed and said outflow opening is open, to an operative position in which said valve is open and said outflow opening is closed, means locking said closing and opening means and said valve in said operative position, a liquid-responsive device within said measuring container, and means connecting said liquid-responsive device with said locking means and operable to release said locking means.

13. An apparatus in accordance with claim 12, wherein said liquid responsive device consists of means operable when a set weight of liquid fills said measuring container.

References Cited in the file of this patent

UNITED STATES PATENTS

| | | |
|---|---|---|
| 393,110 | Hubert | Nov. 20, 1888 |
| 893,325 | Jewell | July 14, 1908 |
| 1,297,563 | Hardy | Mar. 18, 1919 |
| 1,382,439 | Mioton | June 21, 1921 |
| 1,482,869 | Rogers | Feb. 5, 1924 |
| 1,568,720 | Buelna | Jan. 5, 1926 |
| 1,772,297 | Venable | Aug. 5, 1930 |
| 2,231,059 | Douglass | Feb. 11, 1941 |
| 2,262,317 | Edwards | Nov. 11, 1941 |
| 2,437,764 | Spence | Mar. 16, 1948 |
| 2,451,154 | Davis, Jr. | Oct. 12, 1948 |